United States Patent
Holtman et al.

(10) Patent No.: US 6,895,752 B1
(45) Date of Patent: May 24, 2005

(54) METHOD AND APPARATUS FOR EXHAUST GAS RECIRCULATION COOLING USING A VORTEX TUBE TO COOL RECIRCULATED EXHAUST GASES

(75) Inventors: Richard H. Holtman, Dunlap, IL (US); Mark S. Cavanagh, Bloomington, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/699,086

(22) Filed: Oct. 31, 2003

(51) Int. Cl.$^7$ .......................... F02B 33/44; F02M 25/06
(52) U.S. Cl. .................. 60/605.2; 123/568.12
(58) Field of Search ................. 60/605.2, 279; 123/568.11, 568.12, 568.18, 568.26; F02M 25/06, 25/07

(56) References Cited

U.S. PATENT DOCUMENTS

| | | | |
|---|---|---|---|
| 3,019,780 A | 2/1962 | Nuding | 60/279 |
| 3,397,682 A | 8/1968 | Riggan | 60/279 |
| 3,566,610 A | 3/1971 | Fiore | 60/279 |
| 3,861,142 A | 1/1975 | Bose | 60/274 |
| 3,892,070 A | 7/1975 | Bose | 60/279 |
| 4,270,508 A * | 6/1981 | Lindberg | 123/568.12 |
| 4,345,572 A | 8/1982 | Suzuki et al. | 123/568.11 |
| 4,426,967 A | 1/1984 | McWhorter | |
| 4,503,813 A * | 3/1985 | Lindberg | 123/568.12 |
| 4,587,807 A * | 5/1986 | Suzuki | 60/279 |
| 5,193,341 A | 3/1993 | Sibbertsen et al. | |
| 5,351,669 A * | 10/1994 | Herzog | 123/568.26 |
| 5,461,868 A | 10/1995 | Finko | |
| 5,617,726 A | 4/1997 | Sheridan et al. | 60/605.2 |
| 6,247,460 B1 | 6/2001 | Lindberg et al. | 123/563 |
| 6,502,397 B1 * | 1/2003 | Lundqvist | 60/605.2 |
| 6,742,335 B2 * | 6/2004 | Beck et al. | 60/605.2 |
| 2004/0007220 A1 * | 1/2004 | Sponton | 123/568.18 |

FOREIGN PATENT DOCUMENTS

| | | | | |
|---|---|---|---|---|
| JP | 2002070657 A | * | 3/2002 | F02M/25/07 |
| RU | 2090774 | * | 9/1977 | F02M/25/06 |

OTHER PUBLICATIONS

"Ranque–Hilsch Vortex Tube", Website Printout, Tim Cockerill, 1995.
EXAIR® "A Phenomenon of Physics", Website Printout, EXAIR Corporation, date unknown.
EXAIR® "Vortex Tubes", Website Printout, EXAIR Corporation, date unknown.

* cited by examiner

Primary Examiner—Thai-Ba Trieu
(74) Attorney, Agent, or Firm—Marshall, Gerstein & Borun LLP

(57) ABSTRACT

An engine includes an exhaust conduit, an intake conduit, and a vortex tube disposed between the exhaust conduit and the intake conduit. The vortex tube has an inlet in fluid communication with the exhaust conduit, a cold gas outlet in fluid communication with the intake conduit, and a hot gas outlet.

21 Claims, 2 Drawing Sheets

METHOD AND APPARATUS FOR EXHAUST GAS RECIRCULATION COOLING USING A VORTEX TUBE TO COOL RECIRCULATED EXHAUST GASES

TECHNICAL FIELD

The present invention relates generally to engines and, more particularly, to cooling recirculated exhaust gases in engines.

BACKGROUND

In order to minimize pollutants such as NOX, internal combustion engines may include an exhaust gas recirculation (EGR) system that includes an EGR valve. EGR systems primarily recirculate exhaust gas by-products into the intake air supply of the internal combustion engine. The EGR valve can be used to redirect a portion of exhaust gases to an intake conduit, such as an intake manifold, so that the redirected exhaust gases will be recycled.

The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides ($NO_x$). Furthermore, the exhaust gases typically contain unburned hydrocarbons that are burned on reintroduction into the engine cylinder, further reducing the emission of exhaust gas byproducts that would be emitted as undesirable pollutants from the internal combustion engine.

In order to improve engine performance and reduce emissions of pollutants, it has been found to be advantageous to cool the exhaust gases that are being recirculated by the use of various devices, such as, for example, air-to-air coolers, water to air coolers, or other heat transfer devices. However, such devices require an increase in the overall heat rejection capability of the engine. For example, additional radiators and/or larger, more cumbersome radiators may be required in order to provide such an increased heat rejection capability, especially where the engine is used in a slow-moving vehicle or machine.

It is also known to use a device commonly known as a vortex tube or a Ranque-Hilsch tube in order to separate components of exhaust gases. For example, U.S. Pat. No. 3,566,610 discloses a method and apparatus for separating components of exhaust of an internal combustion engine by density using a vortex tube.

The present invention is directed to overcoming one or more of the problems or disadvantages associated with the prior art.

SUMMARY OF THE INVENTION

An engine is provided in accordance with the disclosure that may include an exhaust conduit, an intake conduit, and a vortex tube in fluid communication with the exhaust conduit and the intake conduit. The vortex tube may include an inlet port in fluid communication with the exhaust conduit, a cold gas outlet port in fluid communication with the intake conduit, and a hot gas outlet port.

In accordance with another aspect of the disclosure, an engine exhaust system is provided that may include an exhaust conduit, an intake conduit, and a vortex tube in fluid communication with the exhaust conduit and the intake conduit. The vortex tube may include an inlet port in fluid communication with the exhaust conduit, a cold gas outlet port in fluid communication with the intake conduit, and a hot gas outlet port.

In accordance with a still further aspect of the disclosure, a method of recirculating exhaust gases in an engine is provided. The engine may include a combustion chamber and the method may include diverting at least a portion of exhaust gases, cooling at least a portion of the diverted exhaust gases in a vortex tube, and reintroducing the cooled exhaust gases into the combustion chamber.

DETAILED DESCRIPTION

Figure 1:
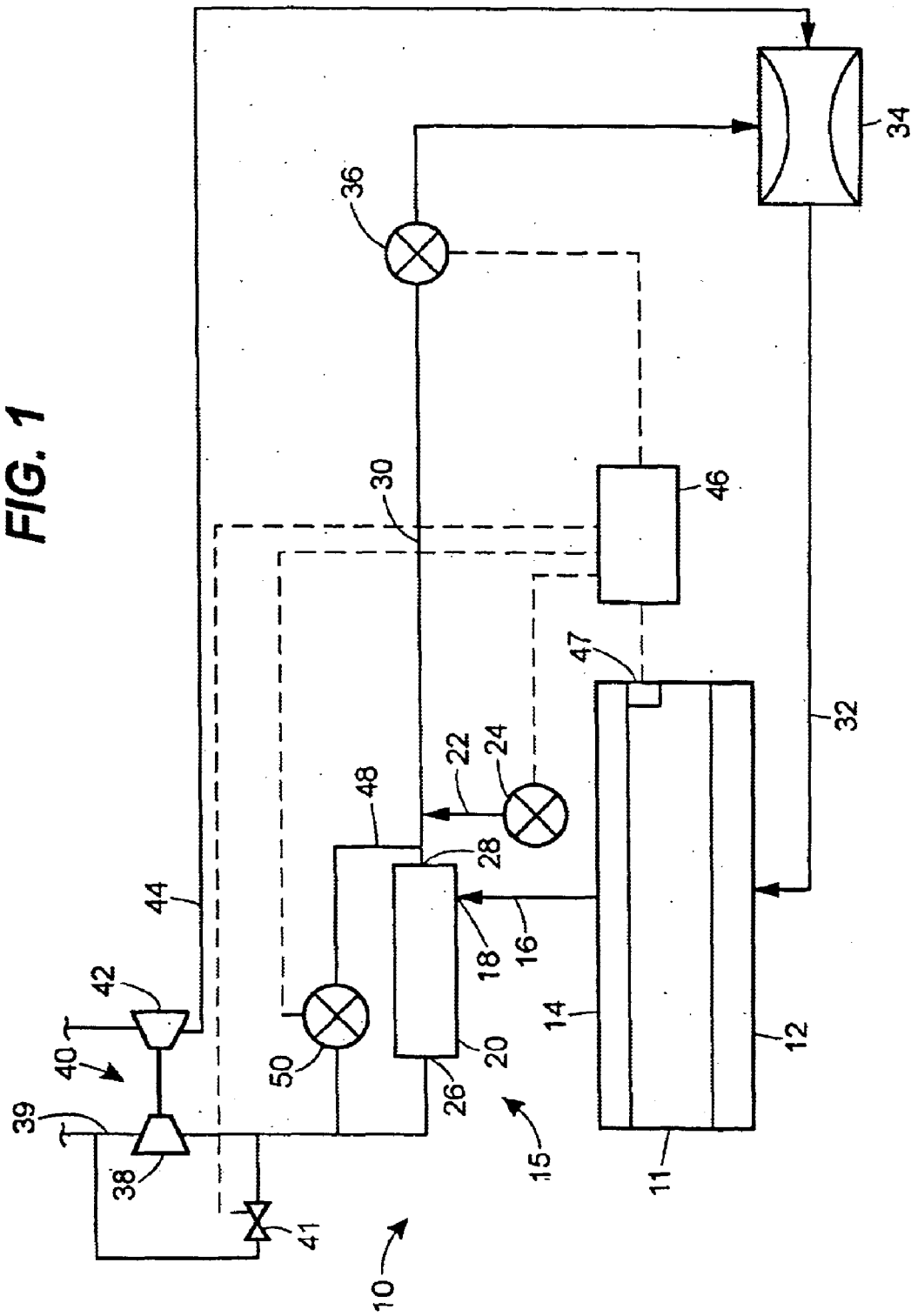
FIG. 1 is a schematic depiction of an embodiment of an engine that includes an exhaust gas recirculation system having a vortex tube for separating relatively hot exhaust gases from relatively cool exhaust gases.

With reference to FIG. 1, an engine, shown schematically, and generally indicated at 10, may include a combustion chamber 11, an intake manifold 12 and an exhaust manifold 14. The engine 10 may further include means±S for recirculating exhaust gases, which may include a primary exhaust gas recirculation conduit 16 in fluid communication with the exhaust manifold 14. The primary exhaust gas recirculation conduit 16 may also be in fluid communication with an inlet 18 of a vortex tube 20. The primary exhaust gas recirculation conduit 16 may also optionally be in fluid communication with a bypass conduit 22 having a bypass valve 24 therein. The vortex tube 20 includes a hot gas outlet 26 and a cold outlet 28 and may be capable of diverting relatively hot exhaust gases to the hot gas outlet 26, and relatively cold gas exhaust gases to the cold gas outlet 28.

The cold gas outlet 28 of the vortex tube 20 may be placed in fluid communication with a cold exhaust gas recirculation conduit 30 that in turn is in fluid communication with an intake air conduit 32. The intake air conduit 32 is in fluid communication with the intake manifold 12, and a venturi conduit 34 may be provided in the intake air conduit 32 to create a low-pressure region for drawing the relatively cold exhaust gases into the intake air conduit 32. An EGR valve 36 may be disposed in the cold exhaust gas recirculation conduit 30. The EGR valve 36 may be an on/off valve or a modulating valve, or any other suitable type of valve.

The hot gas outlet 26 of the vortex tube 20 may lead to a turbine section 38 of a turbocharger assembly 40. Alternatively, the hot gas outlet 26 may simply lead to an exhaust conduit 39 downstream of the turbine section 38 of the turbocharger assembly 40. A wastegate 41 may be provided to selectively divert exhaust gases in order to bypass the turbine section 38. The turbocharger assembly 40 may further include a compressor section 42 that is in fluid communication with the intake air conduit 32 via a compressor outlet conduit 44.

An electronic control unit (ECU) 46 may be used to electronically control the configuration of the bypass valve 24, the wastegate 41, and/or the EGR valve 36.

The ECU 46 may be operatively associated with one or more sensors, such as, for example a sensor 47, associated with the engine 10. The sensor 47 may be adapted, for example, to monitor the status of one or more of: the $CO_2$ content of the exhaust gas, the $O_2$ content of the exhaust gas, the $NO_x$ content of the exhaust gas, the intake mass air flow, the exhaust mass air flow, the EGR mass air flow, coolant temperature, engine speed, vehicle speed, altitude, and/or ambient air pressure. If desired, other sensors, such as pressure sensors and/or air flow rate sensors may be provided in one or more of the exhaust conduit 16, inlet 18 of the vortex tube 20, the bypass conduit 22, the hot gas outlet 26, the cold gas outlet 28, the cold exhaust gas recirculation conduit 30, the intake air conduit 32, and the venturi conduit 34. The ECU 46 may include a microprocessor and associated memory (not shown) adapted to provide the generation of appropriate control signals for use in controlling engine components such as, for example, the bypass valve 24, the EGR valve 36, the wastegate 41, and/or the flow reduction valve 50, based upon output signals received from the sensor 47 and/or other sensors.

A secondary cold exhaust gas conduit 48 may be provided in fluid communication with the cold exhaust gas recirculation conduit 30, and may include a flow reduction valve 50. The secondary cold exhaust gas conduit 48 and the flow reduction valve 50 may be used to divert a portion of the cold exhaust gas exiting from the cold gas outlet 28 to be reunited with the exhaust gases exiting from the hot gas outlet 26, and the flow reduction valve 50 may also be electronically controlled by the ECU 46.

Figure 2:
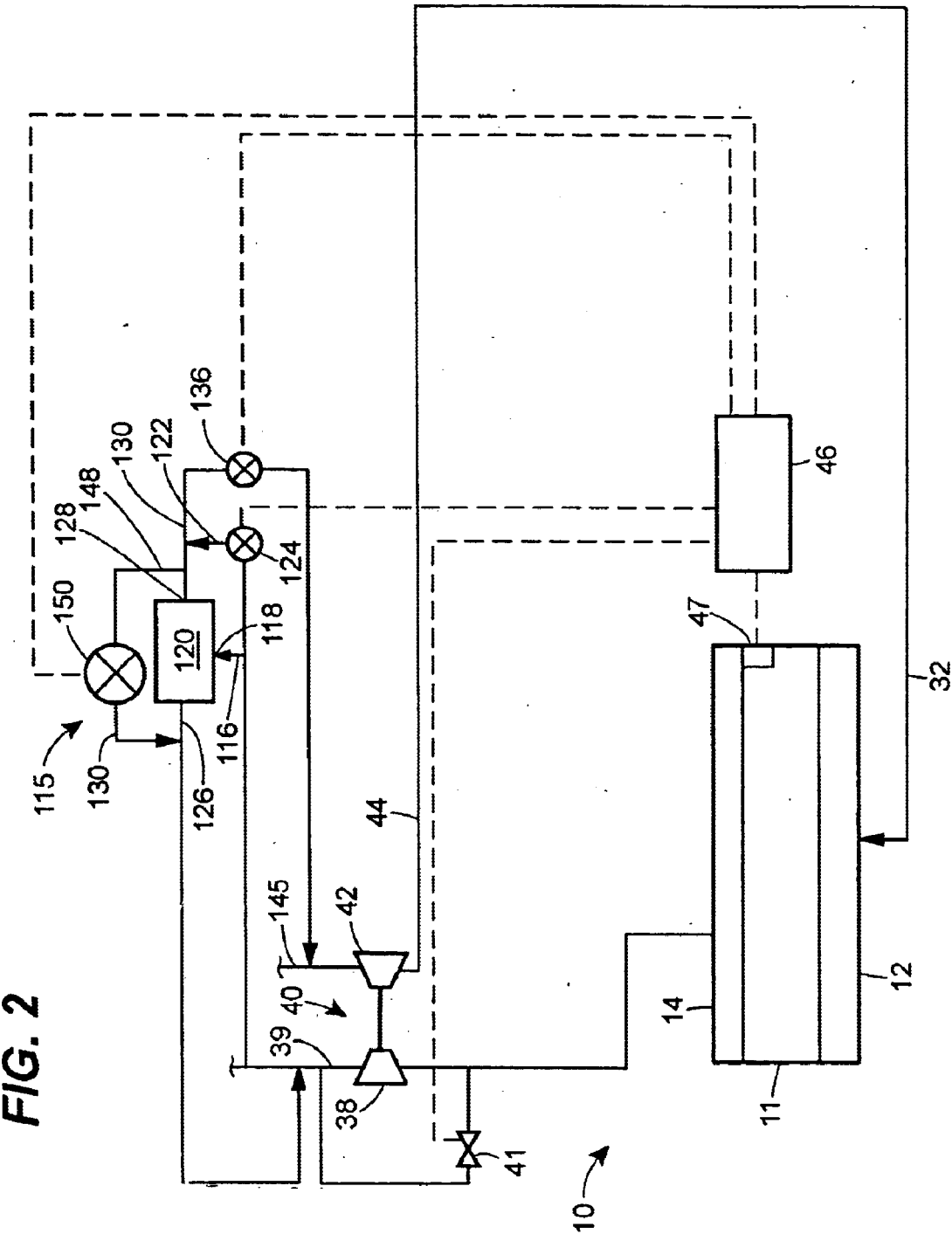
FIG. 2 is a schematic depiction of a second embodiment of an engine that includes an exhaust gas recirculation system having a vortex tube for separating relatively hot exhaust gases from relatively cool exhaust gases, wherein the vortex tube is located outside of a turbocharging system (e.g., downstream of a turbocharger turbine section and upstream of a turbocharger compressor section).

With reference to FIG. 2, an alternative embodiment is depicted in which a means 115 for recirculating gases which may include a primary exhaust gas recirculation conduit 116 in fluid communication with the exhaust conduit 39 downstream of the turbine section 38 of the turbocharger assembly 40. The primary exhaust gas recirculation conduit 116 may also be in fluid communication with an inlet 118 of a vortex tube 120. The primary exhaust gas recirculation conduit 116 may also optionally be in fluid communication with a bypass conduit 122 having a bypass valve 124 therein. The vortex tube 120 includes a hot gas outlet 126 and a cold gas outlet 128 and may be capable of diverting relatively hot exhaust gases to the hot gas outlet 126, and relatively cold exhaust gases to the cold gas outlet 128.

The cold gas outlet 128 of the vortex tube 120 may be placed in fluid communication with a cold exhaust gas recirculation conduit 130 that in turn is in fluid communication with an intake air conduit 145 that is upstream of the compressor section 42 of the turbocharger assembly 40. The venturi conduit 34 depicted in FIG. 1 may not be needed in the embodiment of FIG. 2, so long as the exhaust pressure exceeds the pressure within the conduit 145, but of course a venturi tube may be provided if deemed necessary for a given engine application. An EGR valve 136 may be disposed in the cold exhaust gas recirculation conduit 130. The EGR valve 136 may be an on/off valve or a modulating valve, or any other suitable type of valve.

A secondary cold exhaust gas conduit 148 may be provided in fluid communication with the cold exhaust gas recirculation conduit 130, and may include a flow reduction valve 150. The secondary cold exhaust gas conduit 148 and the flow reduction valve 150 may be used to divert a portion of the cold exhaust gas exiting from the cold gas outlet 128 to be reunited with the exhaust gases exiting from the hot gas outlet 126, and the flow reduction valve 150 may also be electronically controlled by the ECU 46.

The ECU 46 may be used to electronically control the configuration of the valves 150, 124, 136, and/or the waste gate 41, in a manner similar to that described above with respect to the embodiment of FIG. 1.

INDUSTRIAL APPLICABILITY

Again, referring to FIG. 1, in operation, exhaust gases passing through the exhaust manifold 14, or a portion of the exhaust gases, may flow into the inlet 18 of the vortex tube 20 and/or may be diverted through the bypass conduit 22 to the cold exhaust gas recirculation conduit 30. The portion of the exhaust gases that pass through the vortex tube 20 are separated into a relatively hot stream and a relatively cold stream and exit the vortex tube 20 through the hot gas outlet 26 and the cold gas outlet 28, respectively. Exhaust gases exiting the hot outlet 26 may then flow through the turbine section 38 of the turbocharger 40.

The relatively cold exhaust gases exiting the vortex tube 20 at the cold gas outlet 28 may flow into the cold exhaust gas recirculation conduit 30, and/or may be directed via the secondary cold exhaust gas conduit 48, depending on the position of the flow reduction valve 50. If the EGR valve 36 is open, the cold exhaust gas is fed to the intake air conduit 32 and mixes with intake air in the venturi conduit 34.

Due to simplicity of the vortex tube 20, which requires no moving parts, an inexpensive, easy to maintain, and lightweight apparatus is provided for cooling the recirculated exhaust gases of the engine 10.

The embodiment of FIG. 2 operates in a similar manner to that of FIG. 1, with the notable exception that the recirculation of exhaust gases originates from the conduit 39 downstream of the turbine section 38 of the turbocharger assembly 40; and is introduced into the intake air stream at the conduit 145 upstream of the compressor section 42 of the turbocharger assembly 40.

Other aspects and features of the present invention can be obtained from a study of the drawings, the disclosure, and the appended claims.

What is claimed is:

1. A method of recirculating exhaust gases in an internal combustion engine having a combustion chamber, the method comprising:
   diverting at least a portion of exhaust gases;
   cooling at least a portion of the diverted exhaust gases in a vortex tube; and
   introducing the cooled exhaust gases into a high pressure portion of an inlet conduit in fluid communication with an outlet of a compressor.

2. The method of claim 1, wherein the cooled exhaust gases are reintroduced into the combustion chamber after passing through a venturi conduit.

3. An engine comprising:
   an exhaust conduit;
   an intake conduit having a low pressure portion connected to an inlet of a compressor and a high pressure portion extending from an outlet of the compressor;
   a primary exhaust gas recirculation conduit for recirculating at least a portion of gases flowing through the exhaust conduit into the intake conduit;
   a vortex tube having an inlet, a hot outlet, and a cold outlet, wherein the inlet of the vortex tube is in fluid communication with the exhaust gas recirculation conduit and the cold gas outlet of the vortex tube is in fluid communication with the high pressure portion of the intake conduit.

4. The engine of claim 3, further including a venturi tube in fluid communication with the exhaust conduit and the intake conduit.

5. The engine of claim 3, further including an exhaust gas recirculation valve.

6. The engine of claim 5, wherein the exhaust gas recirculation valve is disposed in a cold exhaust gas recirculation conduit that connects the cold gas outlet in fluid communication with the intake conduit.

7. The engine of claim 5, wherein the exhaust gas recirculation valve is electronically controlled.

8. The engine of claim 3, wherein the hot gas outlet is in fluid communication with a turbine section of a turbocharger.

9. The engine of claim 3, further including a bypass conduit providing a fluid connection between the exhaust conduit and the cold exhaust recirculation.

10. The engine of claim 3, further including an electronic control unit and at least one sensor operatively connected to the electronic control unit, wherein the electronic control unit is adapted to generate appropriate control signals for use in controlling the flow of recirculated exhaust gases based upon output signals received from the sensor.

11. An engine comprising:
   an exhaust conduit;
   an intake conduit;
   a primary exhaust gas recirculation conduit for recirculating at least a portion of gases flowing through the exhaust conduit into the intake conduit;
   the primary exhaust gas recirculation conduit being in fluid communication with a vortex tube disposed between the exhaust conduit and the intake conduit, the vortex tube having an inlet, a hot outlet, and a cold outlet, wherein the inlet of the vortex tube is in fluid communication with the exhaust gas recirculation conduit and the cold gas outlet of the vortex tube is in fluid communication with the intake conduit; and
   a secondary cold exhaust conduit adapted to divert at least a portion of cold exhaust gases exiting from the cold outlet to be reunited with exhaust gases exiting from the hot outlet.

12. The engine of claim 11, wherein the secondary cold exhaust conduit includes a flow reduction valve.

13. The engine of claim 12, wherein the flow reduction valve is electronically controlled.

14. An engine exhaust system, comprising:
   an exhaust conduit;
   an intake conduit having a low pressure portion connected to an inlet of a compressor and a high pressure portion extending from an outlet of the compressor;
   a vortex tube disposed between the exhaust conduit and the intake conduit, the vortex tube having an inlet, a hot gas outlet, and a cold gas outlet, the inlet being in fluid communication with the exhaust conduit and the cold gas outlet being in fluid communication with the high pressure compressor outlet portion of the intake conduit.

15. The engine exhaust system of claim 14, further including a venturi tube in fluid communication with the exhaust conduit and the intake conduit.

16. The engine exhaust system of claim 14, further including an exhaust gas recirculation valve.

17. The engine exhaust system of claim 14, further including a bypass conduit providing a fluid connection between the exhaust conduit and the cold gas outlet.

18. The engine exhaust system of claim 14, further including an electronic control unit and at least one sensor operatively connected to the electronic control unit, wherein the electronic control unit is adapted to generate appropriate control signals for use in controlling the flow of recirculated exhaust gases based upon output signals received from the sensor.

19. An engine exhaust system comprising:
   an exhaust conduit;
   an intake conduit;
   a vortex tube disposed between the exhaust conduit and the intake conduit, the vortex tube having an inlet, a hot outlet, and a cold outlet, wherein the inlet of the vortex tube is in fluid communication with the exhaust gas recirculation conduit and the cold gas outlet of the vortex tube is in fluid communication with the intake conduit; and
   a secondary cold exhaust conduit adapted to divert at least a portion of cold exhaust gases exiting from the cold outlet to be reunited with exhaust gases exiting from the hot outlet.

20. The engine exhaust system of claim 19, wherein the secondary cold exhaust conduit includes a flow reduction valve.

21. The engine exhaust system of claim 20, wherein the flow reduction valve is electronically controlled.

* * * * *